(12) United States Patent
Koehler et al.

(10) Patent No.: US 11,460,057 B2
(45) Date of Patent: Oct. 4, 2022

(54) CLIP FOR ATTACHING A TRIM PANEL TO A DOOR

(71) Applicant: Ford Global Technologies, LLC, Dearborn, MI (US)

(72) Inventors: Juergen Koehler, Cologne (DE); Emrah Tokyuerek, Cologne (DE); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 16/816,371

(22) Filed: Mar. 12, 2020

(65) Prior Publication Data

US 2021/0285475 A1 Sep. 16, 2021

(51) Int. Cl.
*F16B 2/24* (2006.01)
*B60J 5/04* (2006.01)

(52) U.S. Cl.
CPC ............. *F16B 2/243* (2013.01); *B60J 5/0463* (2013.01); *B60J 5/0469* (2013.01)

(58) Field of Classification Search
CPC ......... F16B 2/243; F16B 5/065; B60J 5/0463; B60J 5/0469
See application file for complete search history.

(56) References Cited

U.S. PATENT DOCUMENTS

| 5,803,532 | A | 9/1998 | Karuppaswamy et al. |
|---|---|---|---|
| 6,141,837 | A | 11/2000 | Wisniewski |
| 10,145,401 | B2 | 12/2018 | Snoeyink et al. |
| 2007/0046054 | A1 | 3/2007 | Hinman et al. |
| 2018/0209457 | A1 | 7/2018 | Snoeyink et al. |
| 2018/0238364 | A1* | 8/2018 | Izumi ..................... F16B 5/0657 |
| 2020/0041044 | A1* | 2/2020 | Naugler .................. F16L 3/237 |
| 2020/0079297 | A1* | 3/2020 | Dominguez Cuevas ..................... B60R 13/0243 |
| 2020/0173470 | A1* | 6/2020 | Binkert ................... F16B 2/243 |

FOREIGN PATENT DOCUMENTS

EP 3020585 A1 * 5/2016 ............ B60J 5/0415

* cited by examiner

*Primary Examiner* — Lori L Lyjak
(74) *Attorney, Agent, or Firm* — Vichit Chea; Price Heneveld LLP (57) ABSTRACT

A vehicle door assembly is disclosed herein. The vehicle door assembly includes a door. A trim panel has a mount that defines an aperture. A clip that includes a base is coupled to the door. A retainer is coupled to the base and is configured to extend through the aperture defined by the mount to an assembled position, the retainer has an upper portion that is coupled to a lower portion at a vertex to form a projection. A retention feature is coupled to the upper portion and has a ramp. A stop is coupled to the ramp and extends generally downward therefrom to the upper portion. The stop is configured to engage with a back side of the mount to generally prevent the movement of the retainer out of the aperture when the retainer is in the assembled position.

20 Claims, 9 Drawing Sheets

CLIP FOR ATTACHING A TRIM PANEL TO A DOOR

FIELD OF THE DISCLOSURE

The present disclosure generally relates to a clip for attachment to a trim panel. More specifically, the present disclosure relates to a clip for coupling a vehicle door and a trim panel together.

BACKGROUND OF THE DISCLOSURE

Vehicle door assemblies often include an exterior door component and an interior trim component that is configured to be coupled to the door component. Clips and other attachment features may maintain the trim component and the door component in a coupled relationship. Removable clips that generally prevent unintentional decoupling, yet enable intentional decoupling of the trim component and the door component, may be desired.

SUMMARY OF THE DISCLOSURE

According to a first aspect of the present disclosure, a vehicle door assembly includes a door. A trim panel has a mount that defines an aperture. A clip includes a base is coupled to the door. A retainer is coupled to the base and is configured to extend through the aperture defined by the mount to an assembled position. The retainer has an upper portion that is coupled to a lower portion at a vertex to form a projection. An upper barb is coupled to the upper portion and extends generally upward therefrom. A lower barb is coupled to the lower portion and extends generally downward therefrom. The upper barb is configured to engage a periphery of the mount that defines the aperture in the generally upward direction, and the lower barb is configured to engage the periphery in the generally downward direction, when the retainer is in the assembled position. A retention feature is coupled to the upper portion and has a ramp, at least a portion of which angles upward from the upper portion as the ramp extends generally away from the vertex. A stop is coupled to the ramp and extends generally downward therefrom to the upper portion. The stop is configured to engage with a back side of the mount to generally prevent the movement of the retainer out of the aperture when the retainer is in the assembled position.

Embodiments of the first aspect of the disclosure can include any one or a combination of the following features:
  the retention feature extends upward from the upper portion further than the upper barb extends upward from the upper portion;
  the retention feature includes a first retention feature and a second retention feature;
  the upper barb is positioned between the first and second retention features; and
  the upper barb extends generally away from the vertex further than the retention feature extends generally away from the vertex.

According to a second aspect of the present disclosure, a clip includes a base. A retainer is coupled to the base and has an upper portion coupled to a lower portion at a vertex to form a projection. An upper barb is coupled to the upper portion and extends generally upward therefrom and generally away from the vertex. A lower barb is coupled to the lower portion and extends generally downward therefrom and away from the vertex. A retention feature is coupled to the upper portion and has a ramp, at least a portion of which angles upward from the upper portion as the ramp extends generally away from the vertex. A stop is coupled to the ramp and extends generally downward therefrom to the upper portion.

Embodiments of the second aspect of the present disclosure can include any one or a combination of the following features:
  the retention feature extends upward from the upper portion further than the upper barb extends upward from the upper portion;
  the retention feature includes a first retention feature and a second retention feature;
  the upper barb is positioned between the first and second retention features;
  the upper barb extends generally away from the vertex further than the retention feature extends generally away from the vertex;
  the upper and lower barbs are operable to flex from at rest positions to flexed positions. The upper and lower barbs are more proximate to one another than in the at rest positions; and
  the retention feature is rigidly coupled to the upper portion of the retainer.

According to a third aspect of the present disclosure, a vehicle door assemblies includes a door. A trim panel has a mount that defines an aperture. A clip includes a base that is coupled to the door. A retainer is coupled to the base and has an upper portion coupled to a lower portion at a vertex to form a projection. A retention feature is coupled to the upper portion and has a ramp, at least a portion of which angles upward from the upper portion as the ramp extends generally away from the vertex. A stop is coupled to the ramp and extends generally downward therefrom to the upper portion. The clip is operable to move from an unassembled position to an assembled position in which at least a portion of the retainer extends through the aperture. Movement of the clip from the unassembled position to the assembled position causes the ramp of the retention feature to contact a periphery of the mount that defines the aperture, the upper portion of the retainer to flex toward the lower portion as the ramp of the retention feature slides along the periphery, and the upper portion of the retainer to flex back away from the lower portion as the stop of the retention feature moves beyond a back side of the mount.

Embodiments of the third aspect of the disclosure can include any one or a combination of the following features:
  an upper barb coupled to the upper portion and extending generally upward therefrom and generally away from the vertex. A lower barb coupled to the lower portion and extending generally downward therefrom and away from the vertex;
  the retention feature includes a first retention feature and a second retention feature;
  the upper barb is positioned between the first and second retention features;
  the retention feature extends upward from the upper portion further than the upper barb extends upward from the upper portion;
  the upper barb extends generally away from the vertex further than the retention feature extends generally away from the vertex;
  the retention feature does not contact the periphery of the mount that defines the aperture when the clip is in the assembled position; and the stop is configured to engage with a back side of the mount to generally prevent the movement of the retainer out of the aperture when the retainer is in the assembled position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7C, a vehicle door assembly 12 includes a door 28 and a trim panel 44 having a mount 50 that defines an aperture 60. A clip 65 includes a base 66 that is coupled to the door 28 and a retainer 78 that is coupled to the base 66. The retainer 78 is configured to extend through the aperture 60 that is defined by the mount 50 to an assembled position. The retainer 78 includes an upper portion 82 that is coupled to a lower portion 84 at a vertex 86 to form a projection 80. An upper barb 92 is coupled to the upper portion 82 and extends generally upward therefrom. A lower barb 94 is coupled to the lower portion 84 and extends generally downward therefrom. When the retainer 78 is in the assembled position, the upper barb 92 is configured to engage a periphery 62 of the mount 50, which defines the aperture 60, in the generally upward direction, and the lower barb 94 is configured to engage the periphery 62 in the generally downward direction. A retention feature 100 is coupled to the upper portion 82. The retention feature 100 includes a ramp 106, at least a portion of which angles upward from the upper portion 82 as the ramp 106 extends generally away from the vertex 86. The retention feature 100 further includes a stop 108 that is coupled to the ramp 106 and extends generally downward therefrom to the upper portion 82. The stop 108 is configured to engage with a back side 64 of the mount 50 to generally prevent movement of the retainer 78 out of the aperture 60 when the retainer 78 is in the assembled position.

Figure 1:
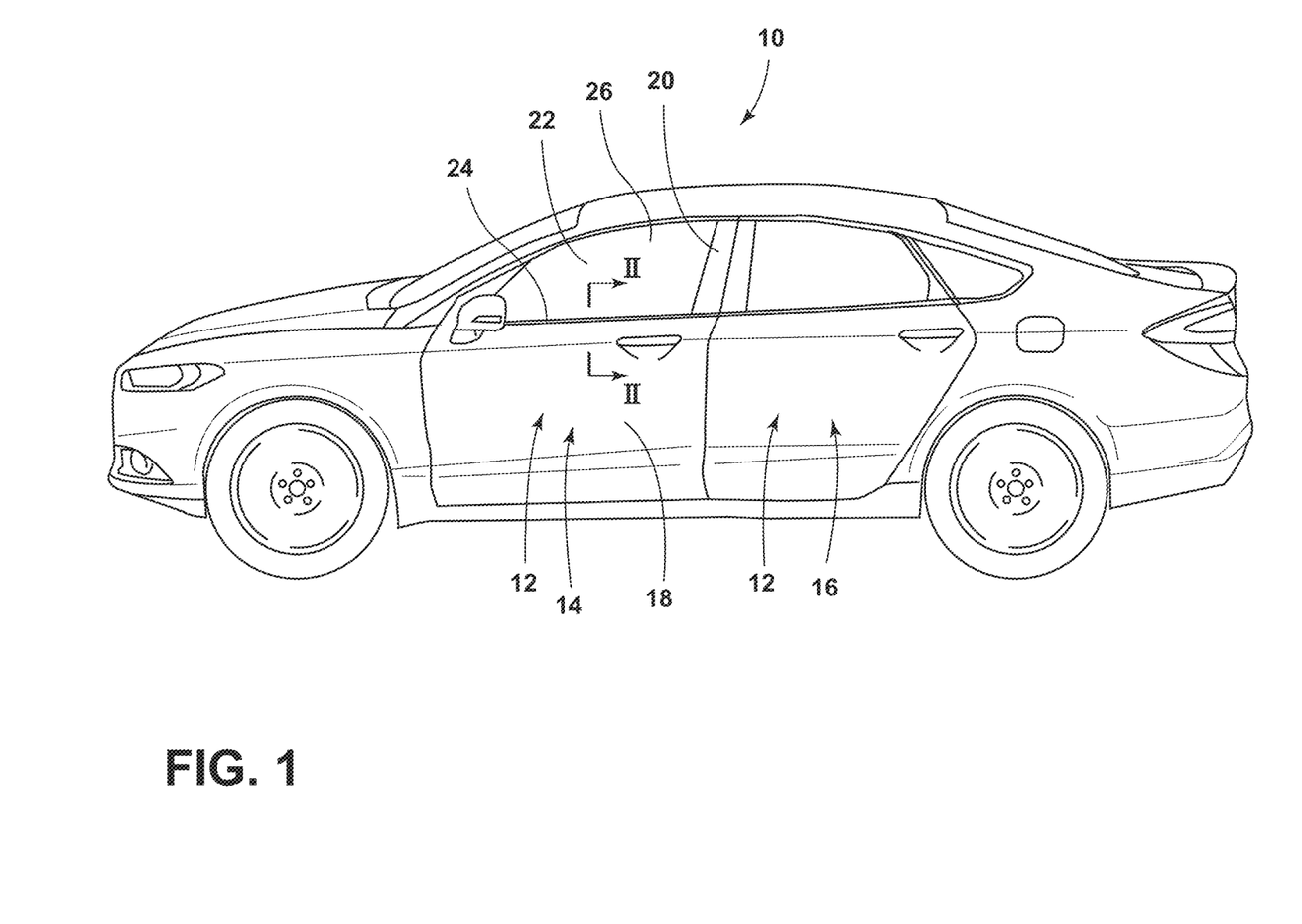
FIG. 1 is a perspective view of a vehicle, illustrating a door assembly of the vehicle, according to one embodiment.

Referring now to FIG. 1, the vehicle 10 includes the door assembly 12. In various embodiments, the vehicle 10 may include a plurality of door assemblies 12. For example, as shown in FIG. 1, the vehicle 10 may include a front door assembly 14 and a rear door assembly 16. The door assembly 12 may include a lower part 18 and an upper part 20. In various embodiments, the upper part 20 of the door assembly 12 may define a window opening 22. As depicted in FIG. 1, in some embodiments, a beltline 24 may generally divide the lower part 18 from the upper part 20 of the door assembly 12. In various embodiments, the door assembly 12 may include a window 26.

Figure 2:
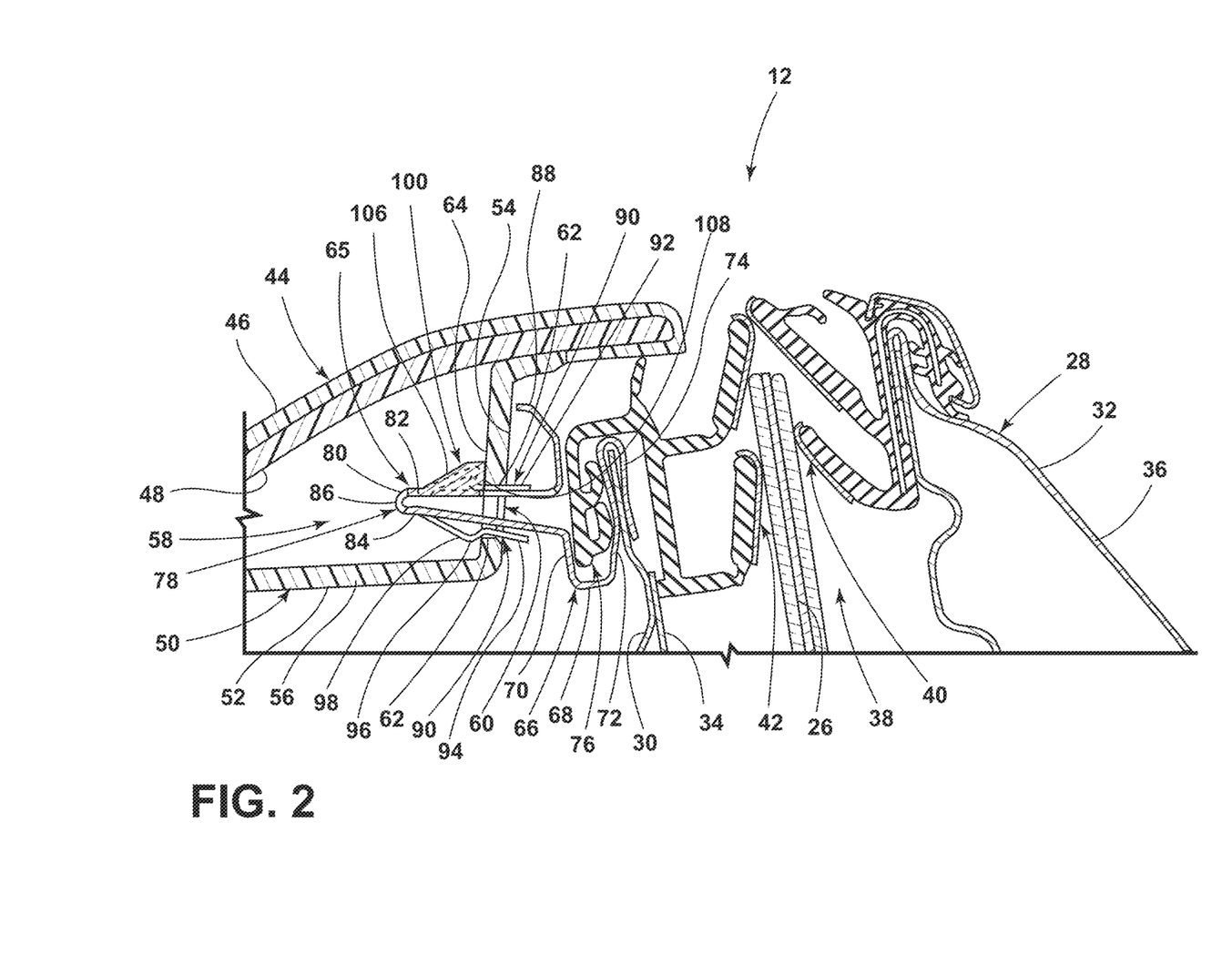
FIG. 2 is a cross-sectional view of a portion of the door assembly taken through line II-II of FIG. 1, illustrating a clip in the assembled position coupling a trim panel to a door, according to one embodiment.

Referring now to FIG. 2, in various embodiments, the door assembly 12 may include the door 28. The door 28 may include an inner panel 30 and an outer panel 32. As shown in FIG. 2, in some embodiments, the door 28 may include a beltline reinforcement 34 that is generally disposed between the inner panel 30 and the outer panel 32. As shown, the beltline reinforcement 34 may be coupled to the inner panel 30. In various embodiments, the outer panel 32 may form an exterior 36 of the door assembly 12, and the inner panel 30 may be disposed generally adjacent to a passenger cabin of the vehicle 10.

In further reference to FIG. 2, the inner panel 30 may be spaced-apart from the outer panel 32 to define a pocket 38. The pocket 38 may be configured to receive the window 26. It is contemplated that a window regulator may be disposed within the door 28 and may be operable to raise and lower the window 26 relative to the door 28. As illustrated in FIG. 2, an outer seal 40 may be supported on the outer panel 32 and may form a seal between the window 26 and the outer panel 32. In some embodiments, the door assembly 12 may further include an inner seal 42 that is configured to form a seal between the window 26 and the inner panel 30 of the door assembly 12. As illustrated in FIG. 2, the inner seal 42 may be supported on a portion of the inner panel 30. In some embodiments, the inner seal 42 may be supported on a portion of the inner panel 30 that is coupled to the beltline reinforcement 34.

In further reference to FIG. 2, in various embodiments, the trim panel 44 may be configured to be coupled to the door 28 of the door assembly 12. In various embodiments, the trim panel 44 may include an exterior surface 46 that may generally face the passenger cabin of the vehicle 10. It is contemplated that the exterior surface 46 may include patting, trimming, and/or other aesthetic and/or comfort features for the passenger cabin. The trim panel 44 may further include an interior surface 48. The interior surface 48 of the trim panel 44 may face the inner panel 30 of the door 28. As shown in FIG. 2, at least one mount 50 may be disposed on the interior surface 48 of the trim panel 44 and may generally extend outward therefrom. In various embodiments, the mount 50 may be utilized for attachment of the trim panel 44 to the door 28. For example, as shown in FIG. 2, in some embodiments, the mount 50 may be configured as a doghouse style receiver 52 that includes a front wall 54, a bottom wall 56, and one or more side walls (not shown). In such embodiments, the mount 50 may generally define an interior space 58, which is depicted in FIG. 2 as being generally bounded by the trim panel 44, the front wall 54, and the bottom wall 56. In various embodiments, the mount 50 may define an aperture 60 that extends through one or more of the walls of the mount 50 to the interior space 58 of the mount 50. As shown in FIG. 2, the portion of the mount 50 that defines the aperture 60 may be referred to as the periphery 62. In various embodiments, the mount 50 may include a back side 64. In some embodiments, the back side 64 of the mount 50 may be the interior space-facing surface of one or more of the walls of the mount 50 that the aperture 60 is extending through. For example, as shown in FIG. 2, the back side 64 of the mount 50 is the interior space-facing surface of the front wall 54 of the mount 50 disposed above the aperture 60 extending through the front wall 54 of the mount 50.

In various embodiments, at least one clip 65 may be used to couple the trim panel 44 to the door 28 during assembly of the door assembly 12. As discussed further below, a portion of the clip 65 may be configured to be coupled to the door 28, while another portion of the clip 65 may be configured to engage with the mount 50 of the trim panel 44. It is contemplated that a plurality of corresponding clips 65 and mounts 50 may be included in the door assembly 12 and, further, that various other types of attachment features may be utilized in attaching the trim panel 44 to the door 28, in various embodiments.

Referring now to FIGS. 2-5, in various embodiments, the clip 65 may include a base 66 configured to be coupled to the door 28 of the door assembly 12. As illustrated in FIGS. 2-5, in some embodiments, the base 66 may include a bottom 68, a front 70, and a back 72. The base 66 may further include a rear folded-over portion 74 that may be adjacent to the back 72. The rear folded-over portion 74 may be configured to receive a portion of the door 28. For example, as shown in FIG. 2, the rear folded-over portion 74 receives part of the inner panel 30 of the door 28 therein. In some embodiments, the front 70 and back 72 of the base 66 of the clip 65 may be spaced-apart by the bottom 68 of the base 66, and may cooperate to define a cavity 76. As shown in FIG. 2, in some embodiments, a portion of the inner seal 42 may generally wrap around the rear folded-over portion 74 of the base 66 and extend into the cavity 76 generally defined by the front 70, back 72, and bottom 68 of the base 66 of the clip 65. It is contemplated that, in various embodiments, the clip 65 may include a variety of types of bases configured to allow the clip 65 to attach to various portions of the door 28.

Referring now to FIGS. 2-5, the clip 65 may include the retainer 78. In various embodiments, at least a portion of the retainer 78 may be configured to be received through the aperture 60 defined by the mount 50 to couple the trim panel 44 to the door 28 via the clip 65. The retainer 78 may include the projection 80 coupled to the base 66 of the clip 65. In some embodiments, the projection 80 may be generally U-shaped. In various embodiments, the projection 80 may be coupled to the front 70 of the base 66 of the clip 65 and may project outward therefrom in a direction that is generally perpendicular to the front 70 of the base 66, as shown in FIG. 2. The projection 80 may include the upper portion 82, the lower portion 84, and the vertex 86 that interconnects the upper and lower portions 82, 84. In various embodiments, the base 66 of the clip 65 may be coupled to the lower portion 84 of the projection 80, as shown in FIGS. 2-5. As further illustrated in FIGS. 2-5, in some embodiments, a tail feature 88 may be coupled to and/or extend out of a distal end of the upper portion 82 of the retainer 78 relative to the vertex 86 of the retainer 78. The tail feature 88 may extend generally upward from the upper portion 82 and may be utilized in purposeful removal of the retainer 78 from the assembled position. In some embodiments, the tail feature 88 may positively engage the side of the front wall 54 of the mount 50 opposite the back side 64 when the clip 65 is in the assembled position. As described further herein, the projection 80 may be formed of a resilient material that allows the upper and lower portions 82, 84 to be compressed toward one another when acted upon by a force and to rebound away from one another when the force is removed. In various embodiments, the upper and lower portions 82, 84 may flex toward and away from one another generally about the vertex 86 coupling the upper portion 82 and the lower portion 84 together.

In further reference to FIGS. 2-5, in various embodiments, the retainer 78 may include a barb 90 configured to aid in maintaining the retainer 78 in assembly with the mount 50 of the trim panel 44. In some embodiments, the retainer 78 may include a plurality of barbs 90. For example, as shown in FIG. 2, the upper barb 92 may be coupled to the upper portion 82 of the projection 80 of the retainer 78, and the lower barb 94 may be coupled to the lower portion 84 of the projection 80 of the retainer 78. As shown, the upper barb 92 may extend generally upward from the upper portion 82 and generally away from the vertex 86 of the projection 80. The lower barb 94 may extend generally downward from the lower portion 84 and generally away from the vertex 86 of the projection 80. As described further herein, the barbs 90 may be formed of a resilient material that allows the upper and lower barbs 92, 94 to be compressed toward one another to flexed positions when acted upon by a force and to rebound away from one another to at rest positions when the force is removed. The upper and lower barbs 92, 94 may be more proximate to one another when in the flexed positions than the upper and lower barbs 92, 94 are when in the at rest positions. The resiliency of the one or more barbs 90 may be advantageous for maintaining the retainer 78 in assembly with the mount 50 of the trim panel 44. For example, as shown in FIG. 2, the upper and lower barbs 92, 94 are in the flexed position to hold the retainer 78 in the assembled position.

In some embodiments, the one or more barbs 90 of the retainer 78 may include one or more catch features 96. For example, as shown in FIGS. 2-5, the upper and lower barbs 92, 94 may be shaped to include the catch feature 96 in the form of a ridge 98 disposed generally at a midpoint of the barbs 90. The catch features 96 may aid in maintaining the retainer 78 in assembly with the mount 50 of the trim panel 44, in some embodiments, as discussed further below.

Figure 3:
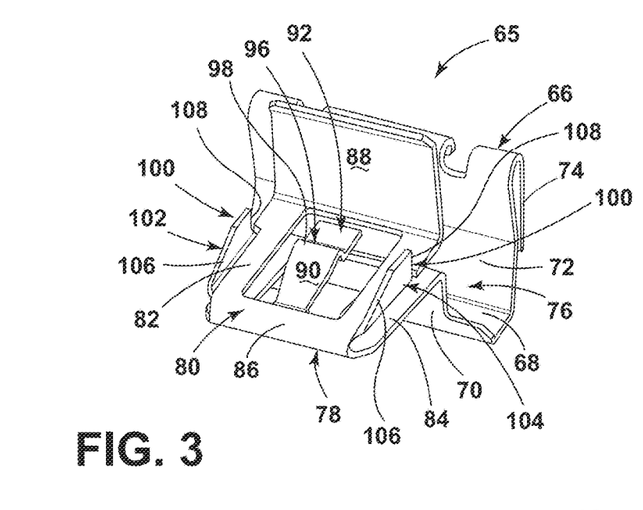
FIG. 3 is a perspective view of the clip, illustrating a retention feature coupled to the clip, according to one embodiment.
Figure 4:
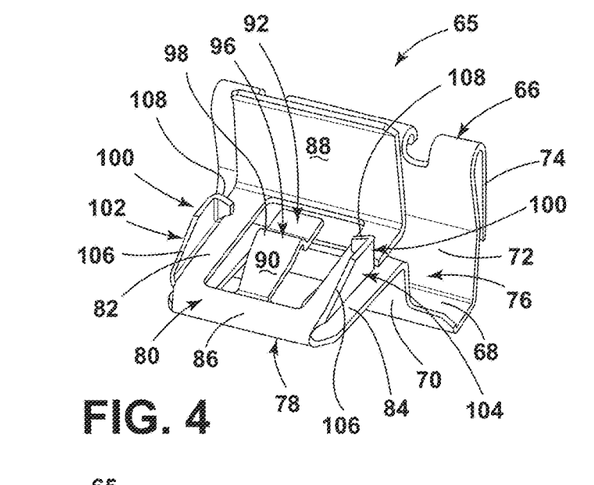
FIG. 4 is a perspective view of the clip, illustrating the retention feature coupled to the clip, according to one embodiment.
Figure 5:
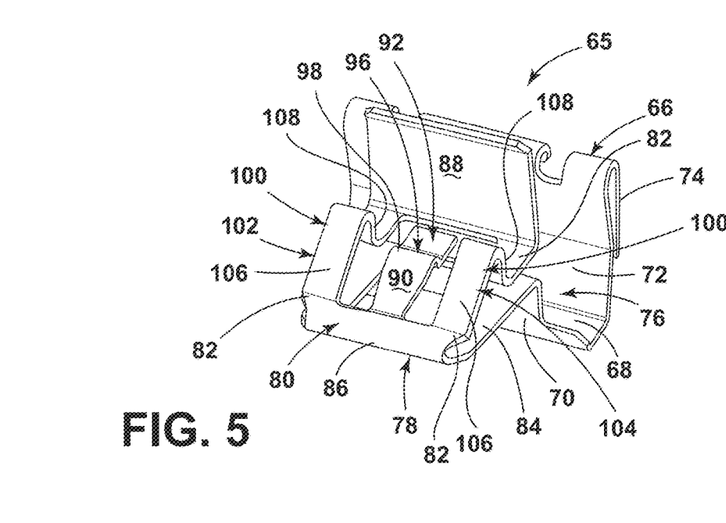
FIG. 5 is a perspective view of the clip, illustrating the retention feature coupled to the clip, according to one embodiment.

In further reference to FIGS. 2-5, the retainer 78 may include a retention feature 100 configured to maintain the retainer 78 in assembly with the mount 50 of the trim panel 44. In various embodiments, the retainer 78 may include a plurality of retention features 100. For example, as shown in FIGS. 3-5, the retainer 78 may include a first retention feature 102 and a second retention feature 104. The first and second retention features 102, 104 may be coupled to the upper portion 82 of the retainer 78 and may respectively include a ramp 106 and a stop 108 coupled to the ramp 106. In various embodiments, at least a portion of the ramp 106 of the retention feature 100 may angle upward from the upper portion 82 as the ramp 106 extends generally away from the vertex 86 of the retainer 78. The stop 108 of the retention feature 100 may be coupled to the ramp 106 and may extend generally downward therefrom to the upper portion 82 of the retainer 78. In various embodiments, the stop 108 may be further from the vertex 86 of the retainer 78 than the ramp 106 of the retention feature 100. In some embodiments, the stop 108 may extend downward from the ramp 106 of the retention feature 100 to the upper portion 82 of the retainer 78, such that the stop 108 and the upper portion 82 of the retainer 78 are generally perpendicular to one another.

As illustrated in FIGS. 3-5, in various embodiments, the retention feature 100 may be shaped in various fashions. As shown in FIGS. 3 and 4, in some examples, the retention feature 100 may extend upward from the upper portion 82 of the retainer 78 generally along the extent of the retention feature 100, such that the side surface of the retention feature 100 and the upper surface of the upper portion 82 respectively resemble a wall adjacent to a floor. As illustrated in FIG. 4, in some examples, a portion of the retention feature 100 may turn inboard to form the stop 108. In some examples, as illustrated in FIG. 5, the retention feature 100 may extend out of the upper portion 82 of the retainer 78, such that the upper portion 82 terminates at the initiation of the ramp 106 and resumes by extending from the stop 108 of the retention feature 100 in a direction generally away from the vertex 86. The retention feature 100 designs illustrated in FIGS. 3-5 may provide varying levels of retention strength for use in various applications. For example, the surface areas of the stops 108 in FIG. 3 are smaller than those of FIG. 4 and the surface areas of the stops of FIG. 4 are smaller than those of FIG. 5. As such, the retention strength of the retention features 100 in FIG. 5 may be greater than the retention strength of the retention features 100 in FIG. 4. Likewise, the retention strength of the retention features 100 of FIG. 4 may be greater than the retention strength of the retention features 100 of FIG. 3.

In some embodiments, the one or more barbs 90 coupled to the retainer 78 may be disposed generally between the first and second retention features 102, 104. In some embodiments, the one or more barbs 90 of the retainer 78 may extend generally away from the vertex 86 of the retainer 78 further than the retention feature 100 extends away from the vertex 86. In some embodiments, the one or more retention features 100 may be rigidly coupled to the retainer 78. For example, in some embodiments, the first retention feature 102 and the second retention feature 104 may be rigidly coupled to the upper portion 82 of the retainer 78. In such embodiments, the one or more retention features 100 may remain generally and/or substantially fixed relative to the upper portion 82 of the retainer 78. As shown in FIGS. 3-5, in various embodiments, the one or more retention features 100 may extend upward from the upper portion 82 of the retainer 78 further than the upper barb 92 extends upward from the retainer 78. As discussed further herein, in various embodiments, the ramp 106 of the retention feature 100 may aid in causing the upper portion 82 to flex toward the lower portion 84 as the retainer 78 is inserted into the aperture 60 defined by the mount 50, and the stop 108 of the retention feature 100 may aid in retaining the retainer 78 within the interior space 58 of the mount 50 by engaging the back side 64 of the mount 50.

It is contemplated that the clip 65 may made of one or more of a variety of materials (e.g., plastic, metal, etc.) It is further contemplated that, in various embodiments, various portions of the clip 65 may be integrally coupled to one another. For example, in some embodiments, the retainer 78 of the clip 65 (i.e. the projection 80, one or more barbs 90, and the retention feature 100) may be a single unitary body. In other words the components of the retainer 78 may be integrally coupled to one another. In some embodiments, the clip 65, as a whole, may be a single unitary body, in which the components are integrally coupled together. For example, the clip 65 may be a single plastic piece that was integrally formed, in some embodiments.

Figure 6A:
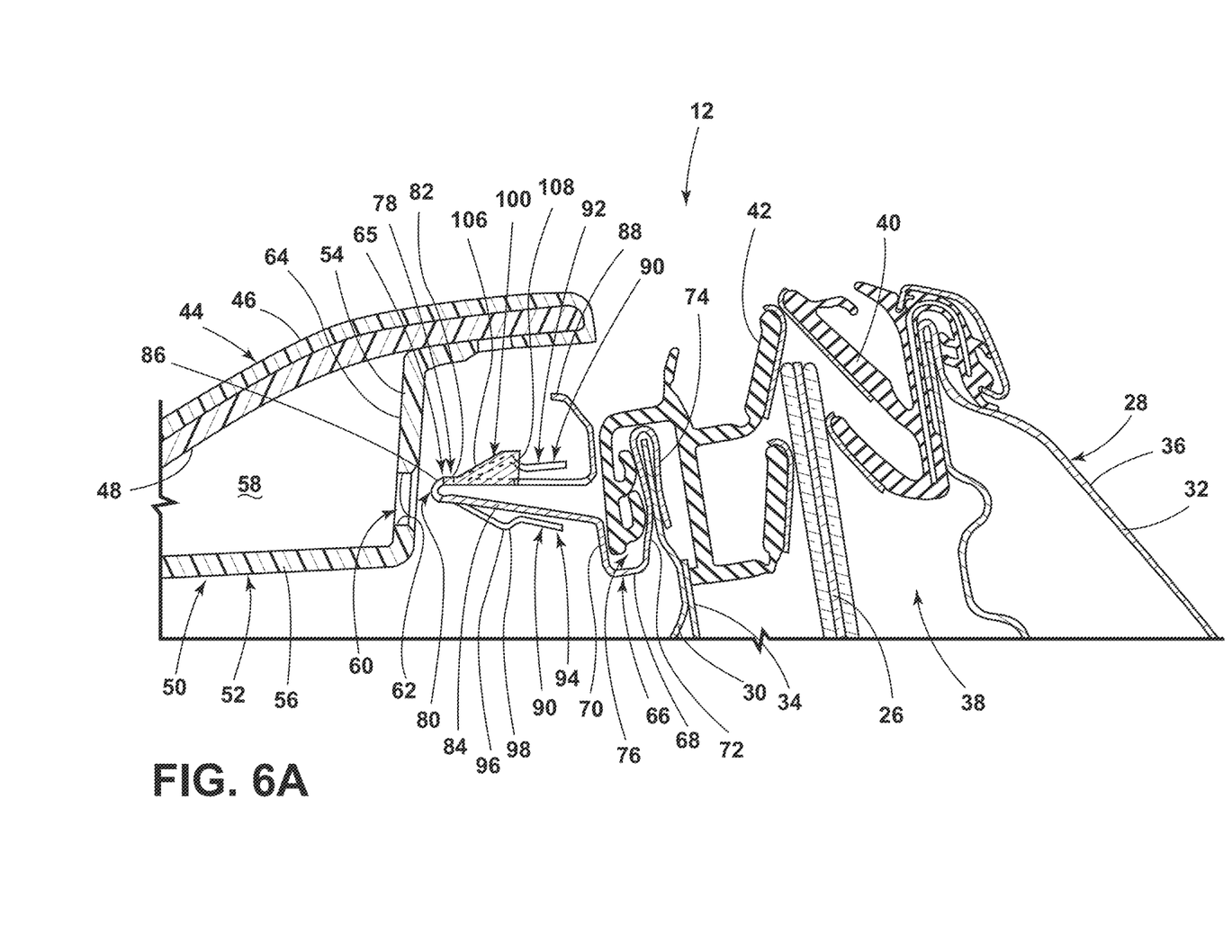
FIG. 6A is a cross-sectional view of the portion of the door assembly of the vehicle, illustrating the clip coupled to the door of the door assembly and in the unassembled position relative to the trim panel of the door assembly, according to one embodiment.

Referring now to FIGS. 2 and 6A-6C, the process of coupling the door 28 to the trim panel 44 via the clip 65 by moving the clip 65 from the unassembled position to the assembled position is illustrated. In operation of the illustrated embodiment, the door 28 and the trim panel 44 are initially not assembled with one another, as shown in FIG. 6A. The base 66 of the clip 65 is coupled to the door 28 of the door assembly 12, and the retainer 78 is not yet contacting the mount 50 of the trim panel 44. As such, the upper and lower portions 82, 84 of the retainer 78 and the upper and lower barbs 92, 94 coupled to the retainer 78 are in at rest positions.

Figure 6B:
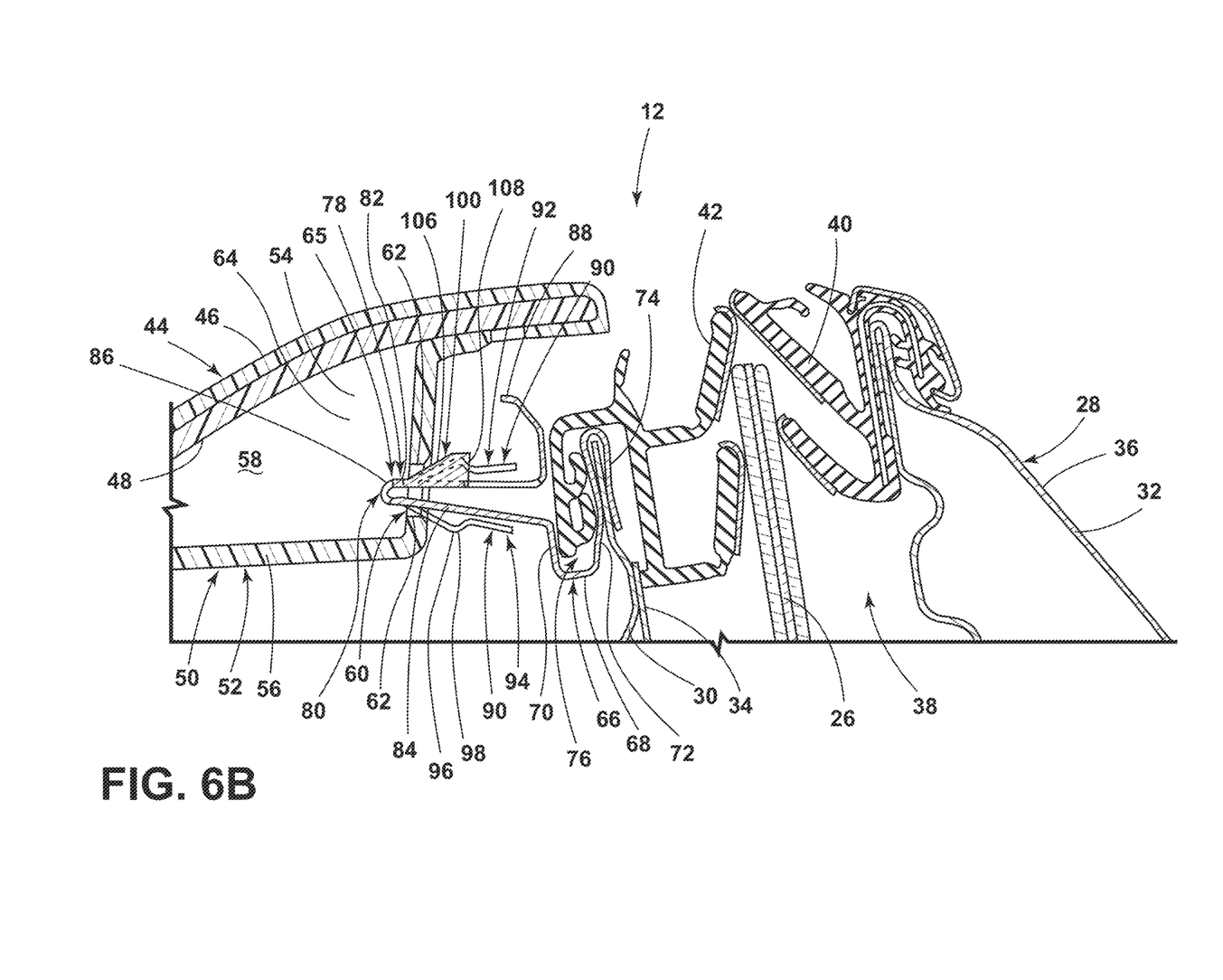
FIG. 6B is a cross-sectional view of the portion of the door assembly of the vehicle, illustrating the clip coupled to the door and partially inserted into an aperture defined by a mount coupled to the trim panel, according to one embodiment.
Figure 6C:
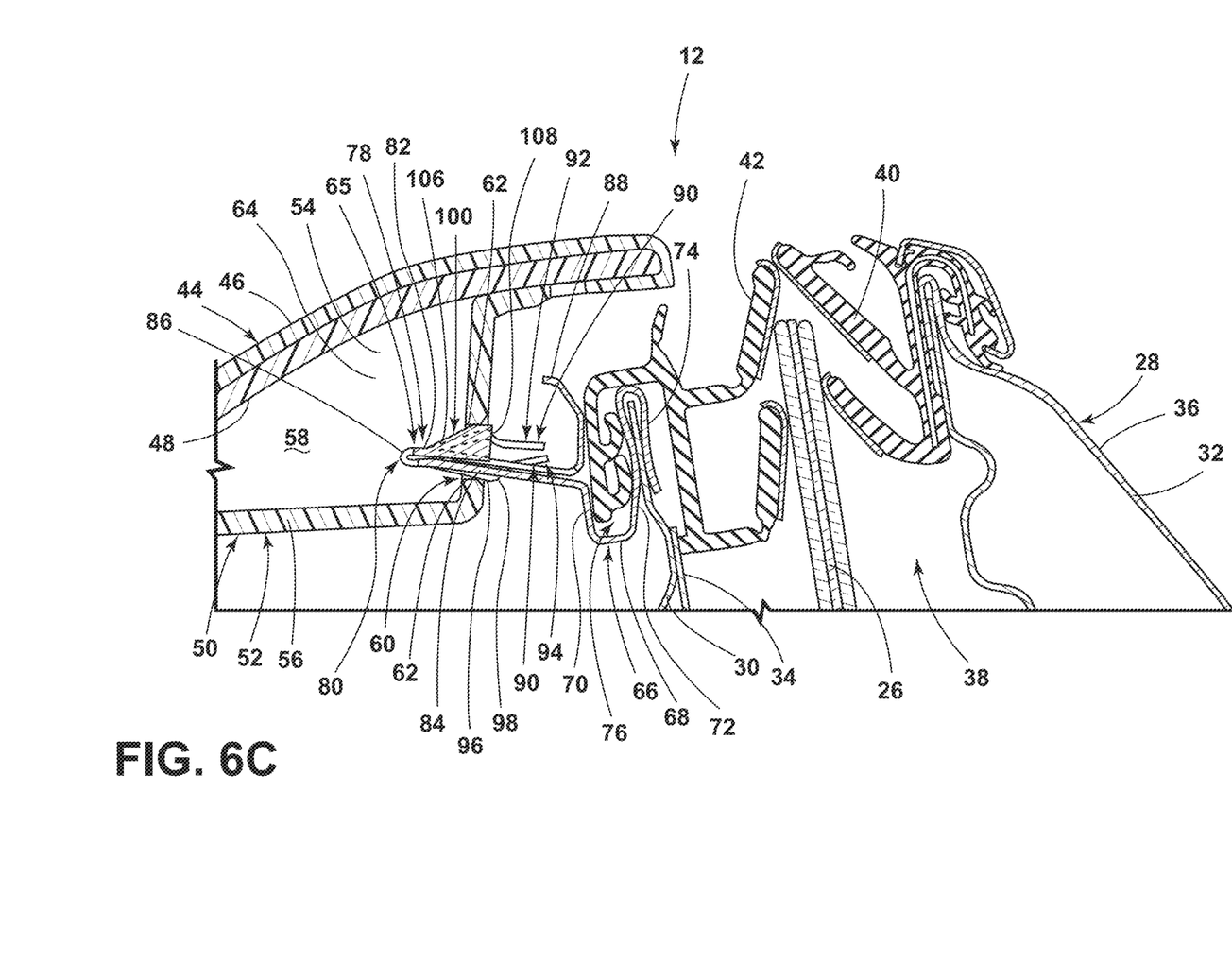
FIG. 6C is a cross-sectional view of the portion of the door assembly of the vehicle, illustrating the clip coupled to the door and partially inserted into the aperture defined by the mount coupled to the trim panel, according to one embodiment.

Referring now to FIG. 6B, the door 28 and the trim panel 44 are moved together, such that the vertex 86 of the retainer 78 has entered the aperture 60 of the mount 50, the retention feature 100 is in contact with a portion of the periphery 62 of the mount 50 defining the aperture 60, and the lower barb 94 of the retainer 78 is in contact with the periphery 62 of the aperture 60. As the door 28 and the trim panel 44 are moved closer together, the retention feature 100 slides along the periphery 62 of the mount 50. A force is exerted onto the retention feature 100 and the lower barb 94 of the retainer 78 by the periphery 62 of the mount 50, because the periphery 62 is smaller in height than the distance between the upward most portion of the retention feature 100 and the downward most portion of the lower barb 94 when the lower barb 94 and the upper and lower portions 82, 84 of the retainer 78 are in at rest positions, respectively. The force being applied to the retention feature 100 and the lower barb 94 biases the attached upper portion 82 toward the lower portion 84 of the retainer 78, and the lower barb 94 toward the upper barb 92 of the retainer 78 into the flexed positions due to the angle of incidence between the periphery 62 of the mount 50 and the ramp 106 of the retention feature 100, as well as the angle of incidence between the periphery 62 of the mount 50 and the lower barb 94, as shown in FIG. 6C. The retainer 78 is compressed as a result, which enables the retainer 78 to fit through the aperture 60 in the mount 50 as the clip 65 is inserted further into the mount 50.

As the door 28 and the trim panel 44 continue to move closer to one another, the retainer 78 enters the assembled position, as shown in FIG. 2, by moving into the aperture 60 until the stop 108 of the retention feature 100 moves beyond the inner edge of the periphery 62 of the mount 50 defining the aperture 60. When this occurs, the upper and lower portions 82, 84 of the retainer 78 (no longer biased together via the forceful contact between the periphery 62 and the ramp 106) rebound back toward at rest positions. This rebound moves the retention feature 100 upward such that the stop 108 of the retention feature 100 is positioned adjacent to the back side 64 of the front wall 54 of the mount 50 within the interior space 58 of the mount 50. As such, the stop 108 of the retention feature 100 may be configured to engage with the back side 64 of the mount 50 to generally prevent movement of the retainer 78 out of the aperture 60 defined by the mount 50. As shown in FIG. 2, the stop 108 of the retention feature 100 may contact the back side 64 of the mount 50 (illustrated as the interior space 58 facing side of the front wall 54 of the mount 50). This contact may impede or prevent the retainer 78 from being dislodged from the mount 50 unintentionally in various situations. As show in FIG. 2, in some embodiments, the retention feature 100 may be oriented while in the assembled position such that the retention feature 100 does not contact the periphery 62 of the mount 50.

As illustrated in FIG. 2, the upper and lower barbs 92, 94 of the retainer 78 may be in contact with the periphery 62 of the aperture 60 of the mount 50 when the retainer 78 is in the assembled position, as described. This contact is induced by the resilient nature of the upper and lower barbs 92, 94 that compels the upper and lower barbs 92, 94 toward at rest positions. As such, a force is created between the periphery 62 of the aperture 60 and the upper and lower barbs 92, 94 that may aid in minimizing rattling between the mount 50 and the retainer 78 of the clip 65.

Figure 7A:
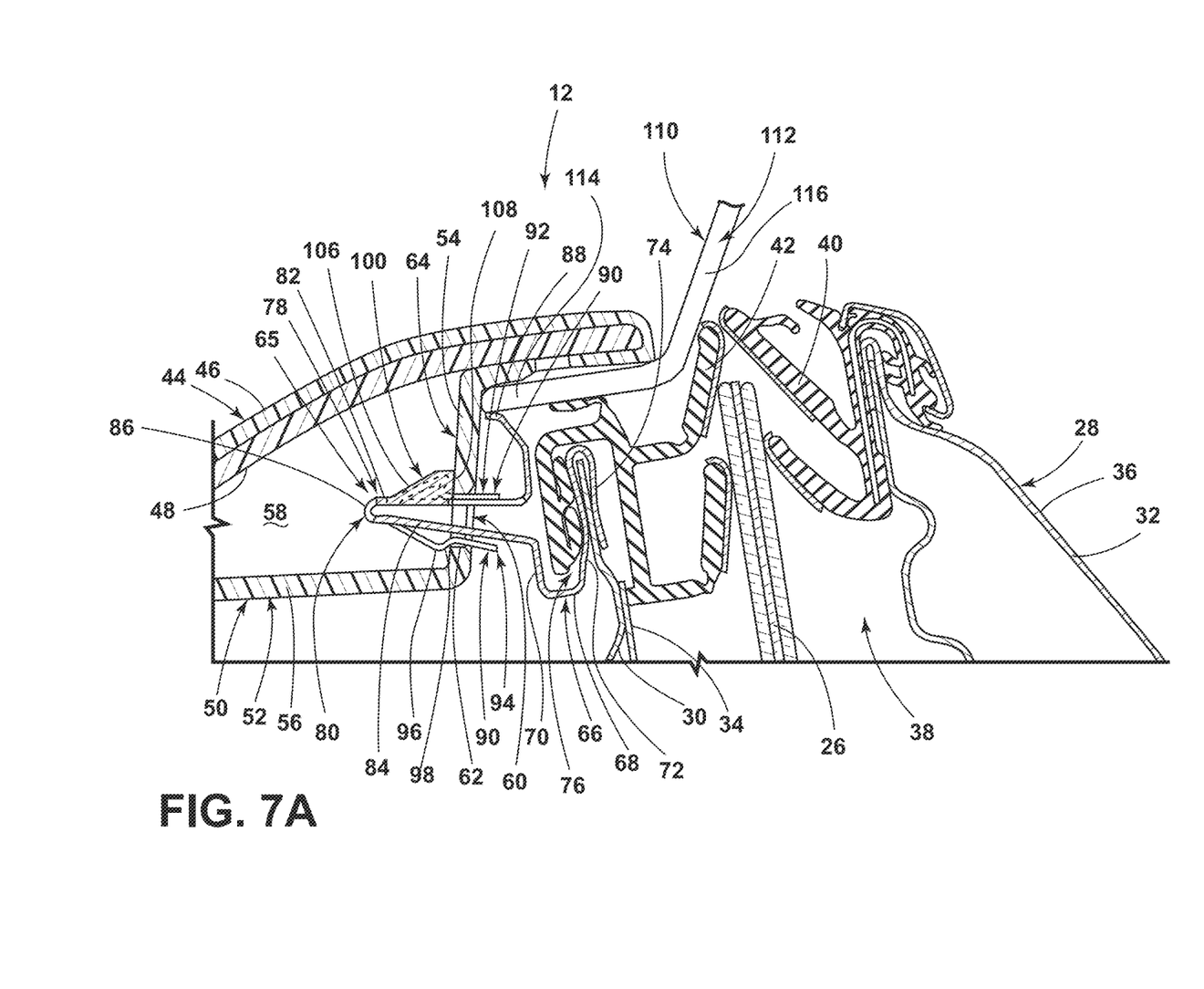
FIG. 7A is a cross-sectional view of the portion of the door assembly of the vehicle, illustrating the clip in the assembled position and a removal tool protruding into the door assembly through a gap between an inner seal of the door assembly and the trim panel, according to one embodiment.
Figure 7B:
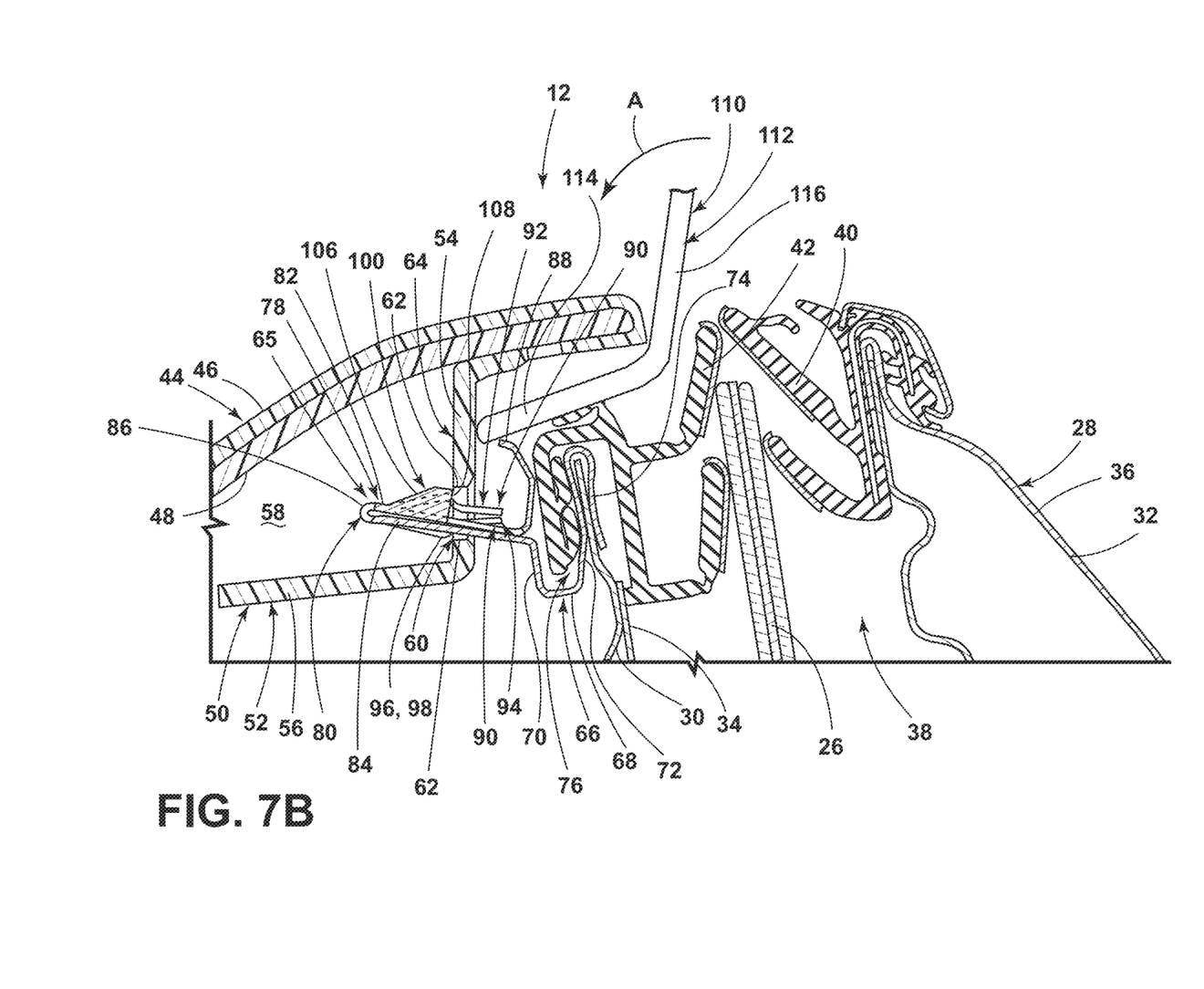
FIG. 7B is a cross-sectional view of the portion of the door assembly of the vehicle, illustrating the removal tool protruding into the door assembly and in a forward-pivoted position that prompts the retention feature of the clip to move below an upper periphery of the mount that defines the aperture, according to one embodiment.
Figure 7C:
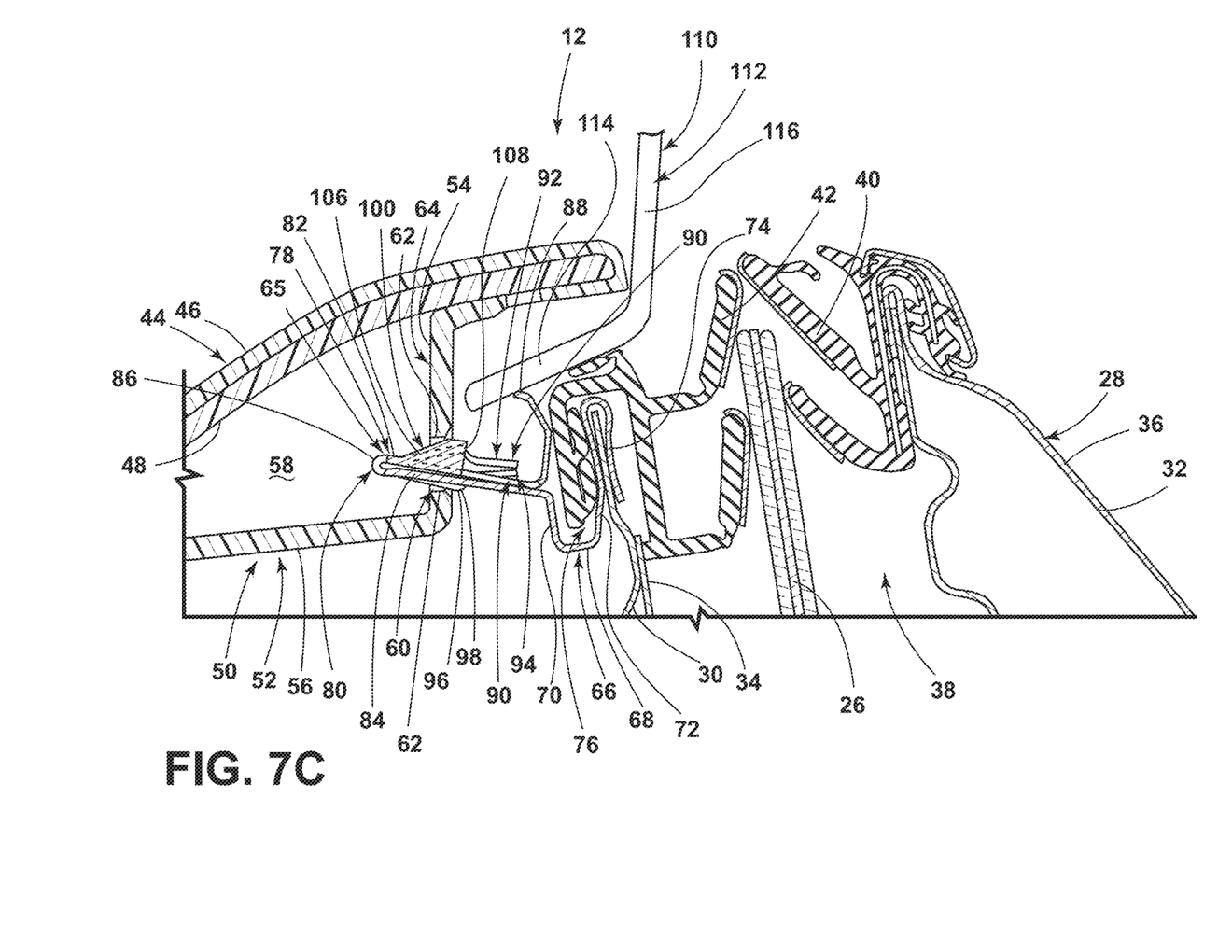
FIG. 7C is a cross-sectional view of the portion of the door assembly of the vehicle, illustrating the removal tool maintaining the retention feature of the clip in the downward position, and the trim panel of the door assembly in a position that is distanced from the door of the door assembly, such that the clip is not fully inserted into the aperture defined by the amount in the trim panel, according to one embodiment.

Referring now to FIGS. 7A-7C, in various embodiments, the clip 65 of the door assembly 12 may be configured to be removed by a user via utilization of a removal tool 110. As depicted in FIGS. 7A-7C, in various embodiments, the removal tool 110 may be an elongated member 112. In some embodiments, the elongated member 112 may include a first section 114 coupled to a second section 116 to form a generally L-shaped portion of the elongated member 112.

In operation, the first section 114 of the generally L-shaped removal tool 110 may be inserted between the inner seal 42 and an adjacent portion of the trim panel 44 when the window 26 is in a rolled down position, as shown in FIG. 7A. A portion of the inserted first section 114 of the L-shaped removal tool 110 may be maneuvered by the user to contact the tail feature 88 of the clip 65, which is generally adjacent to the front wall 54 of the mount 50 of the trim panel 44 as shown in FIG. 7A. From this position, the user may apply a force to the second section 116 of the elongated member 112 in a direction that generally corresponds with arrow A, as illustrated in FIG. 7B. This application of force to the second section 116 causes the elongated member 112 to act as a lever braced by a portion of the trim panel 44, which acts as a fulcrum. As the second section 116 of removal tool 110 is moved along arrow A, the first section 114 sweeps downward and generally toward the door 28 of the door assembly 12. The tail feature 88 of the clip 65 is caught by the first section 114 as the first section 114 sweeps in this manner, which causes the tail feature 88 to move downward with the first section 114 of the removal tool 110. Movement of the tail feature 88 in the downward direction causes the attached upper portion 82 of the retainer 78 to flex toward the lower portion 84 of the retainer 78, as shown in FIG. 7B. As illustrated, the upper portion 82 is flexed toward the lower portion 84 until the ramp 106 of the retention feature 100 is able to pass below the upper portion of the periphery 62 defining the aperture 60 in the mount 50. From this position, the user may apply a force to the trim panel 44 in a direction away from the door 28 to cause the retainer 78 to exit the aperture 60, as illustrated in FIG. 7C. In various embodiments, movement of the retainer 78 from the assembled position to the unassembled position and removal of the trim panel 44 from the door 28 may be accomplished in this fashion. It is contemplated that the removal tool 110 may be a variety of tools configured to remove the clip 65 from the mount 50 of the trim panel 44, in various embodiments.

The present disclosure may provide for a variety of advantages. First, the retention feature 100 may allow for convenient insertion of the retainer 78 into the mount 50 and may generally prevent unintentional removal of the retainer 78 from the mount 50 once initial insertion has occurred.

Additionally, the utilization of the retention feature 100 to positively engage the back side 64 of the front wall 54 of the mount 50 and the tail feature 88 to positively engage the side of the front wall 54 opposite the back side 64 when the clip 65 is in the assembled position may aid in preventing removal of the clip 65 from the mount 50 via linear outward movement induced by forceful vehicle 10 events. Second, the removal tool 110 may aid in allowing convenient intentional removal of the clip 65 from the trim panel 44. Third, the one or more barbs 90 coupled to the retainer 78 of the clip 65 may aid in reducing rattling between the retainer 78 and the mount 50 when the retainer 78 is in the assembled position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door assembly, comprising:
    a door;
    a trim panel having a mount that defines an aperture; and
    a clip comprising:
        a base coupled to the door;
        a retainer coupled to the base and configured to extend through the aperture defined by the mount to an assembled position, the retainer having an upper portion coupled to a lower portion at a vertex to form a projection;
        an upper barb coupled to the upper portion and extending generally upward therefrom;
        a lower barb coupled to the lower portion and extending generally downward therefrom, wherein the upper barb is configured to engage a periphery of the mount that defines the aperture in the generally upward direction and the lower barb is configured to engage the periphery in the generally downward direction when the retainer is in the assembled position; and
        a retention feature coupled to the upper portion and having a ramp, at least a portion of which angles upward from the upper portion as the ramp extends generally away from the vertex, and a stop coupled to the ramp and extending generally downward therefrom to the upper portion, wherein the stop is configured to engage with a back side of the mount to generally prevent the movement of the retainer out of the aperture when the retainer is in the assembled position.

2. The vehicle door assembly of claim 1, wherein the retention feature extends upward from the upper portion further than the upper barb extends upward from the upper portion.

3. The vehicle door assembly of claim 1, wherein the retention feature comprises:
    a first retention feature; and
    a second retention feature.

4. The vehicle door assembly of claim 3, wherein the upper barb is positioned between the first and second retention features.

5. The vehicle door assembly of claim 1, wherein the upper barb extends generally away from the vertex further than the retention feature extends generally away from the vertex.

6. A clip comprising:
    a base;
    a retainer coupled to the base and having an upper portion coupled to a lower portion at a vertex to form a projection;
    an upper barb coupled to the upper portion and extending generally upward therefrom and generally away from the vertex;
    a lower barb coupled to the lower portion and extending generally downward therefrom and away from the vertex; and
    a retention feature coupled to the upper portion and having a ramp, at least a portion of which angles upward from the upper portion as the ramp extends generally away from the vertex, and a stop coupled to the ramp and extending generally downward therefrom to the upper portion.

7. The clip of claim 6, wherein the retention feature extends upward from the upper portion further than the upper barb extends upward from the upper portion.

8. The clip of claim 6, wherein the retention feature comprises:
    a first retention feature; and
    a second retention feature.

9. The clip of claim 8, wherein the upper barb is positioned between the first and second retention features.

10. The clip of claim 9, wherein the upper barb extends generally away from the vertex further than the retention feature extends generally away from the vertex.

11. The clip of claim 6, wherein the upper and lower barbs are operable to flex from at rest positions to flexed positions, wherein the upper and lower barbs are more proximate to one another than in the at rest positions.

12. The clip of claim 11, wherein the retention feature is rigidly coupled to the upper portion of the retainer.

13. A vehicle door assembly, comprising:
    a door;
    a trim panel having a mount that defines an aperture; and
    a clip comprising:
        a base coupled to the door;
        a retainer coupled to the base and having an upper portion coupled to a lower portion at a vertex to form a projection; and
        a retention feature coupled to the upper portion and having a ramp, at least a portion of which angles upward from the upper portion as the ramp extends generally away from the vertex, and a stop coupled to the ramp and extending generally downward therefrom to the upper portion, wherein the clip is operable to move from an unassembled position to an assembled position, in which at least a portion of the retainer extends through the aperture, and movement of the clip from the unassembled position to the assembled position causes the ramp of the retention feature to contact a periphery of the mount that defines the aperture, the upper portion of the retainer to flex toward the lower portion as the ramp of the retention feature slides along the periphery, and the upper portion of the retainer to flex back away from the lower portion as the stop of the retention feature moves beyond a back side of the mount.

14. The vehicle door assembly of claim 13, further comprising:
    an upper barb coupled to the upper portion and extending generally upward therefrom and generally away from the vertex; and
    a lower barb coupled to the lower portion and extending generally downward therefrom and away from the vertex.

15. The vehicle door assembly of claim 14, wherein the retention feature comprises:
   a first retention feature; and
   a second retention feature.

16. The vehicle door assembly of claim 15, wherein the upper barb is positioned between the first and second retention features.

17. The vehicle door assembly of claim 14, wherein the retention feature extends upward from the upper portion further than the upper barb extends upward from the upper portion.

18. The vehicle door assembly of claim 14, wherein the upper barb extends generally away from the vertex further than the retention feature extends generally away from the vertex.

19. The vehicle door assembly of claim 13, wherein the retention feature does not contact the periphery of the mount that defines the aperture when the clip is in the assembled position.

20. The vehicle door assembly of claim 13, wherein the stop is configured to engage with a back side of the mount to generally prevent the movement of the retainer out of the aperture when the retainer is in the assembled position.

\* \* \* \* \*